US006915270B1

(12) United States Patent
Young et al.

(10) Patent No.: US 6,915,270 B1
(45) Date of Patent: Jul. 5, 2005

(54) CUSTOMER RELATIONSHIP MANAGEMENT BUSINESS METHOD

(75) Inventors: Howard Young, Richmond Hill (CA); Cynthia Adiano, Bryan, TX (US); Navin Enand, Cornelius, NC (US); Martha Ernst, Farmersville, OH (US); Harvey Thompson, Ridgefield, CT (US); May Sun Zia, Bexley, OH (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 09/723,519

(22) Filed: Nov. 28, 2000

(51) Int. Cl.[7] .............................................. G06F 17/60
(52) U.S. Cl. .......................................................... 705/10
(58) Field of Search ...................................... 705/7, 10

(56) References Cited

U.S. PATENT DOCUMENTS

| | | | |
|---|---|---|---|
| 4,345,315 A | 8/1982 | Cadotte et al. | |
| 5,041,972 A | 8/1991 | Frost | |
| 5,124,911 A | 6/1992 | Sack | |
| 5,278,751 A | 1/1994 | Adiano et al. | |
| 5,734,890 A | 3/1998 | Case et al. | |
| 5,822,744 A | 10/1998 | Kesel | |
| 5,963,910 A | 10/1999 | Ulwick | |

FOREIGN PATENT DOCUMENTS

JP          200187690 A  *  7/2000   ........... G06F/17/60

OTHER PUBLICATIONS

Goodwin et al. "Closing the Loop on Loyalty." Marketing Management, vol. 8, No. 1, pp. 24–34, Spring 1999.*

* cited by examiner

Primary Examiner—Susanna M. Diaz
(74) Attorney, Agent, or Firm—Whitham, Curtis & Christofferson, P.C.; Jay H. Anderson

(57) ABSTRACT

A loyalty suite business method is described for building profitable customer relationships. The method is based on a combination of Customer Relationship Management (CRM), Business Intelligence (BI) and Customer Value Management (CVM). The structure of the method is based on an engagement model, followed by phases, activities, tasks, work products and technique papers. The Loyalty Suite approach takes a customer-centered view and integrates CRM operational processes, customer collaboration touchpoints and CRM analytical processes. This results in identification of factors which engender loyalty from a customer perspective. This then determines the enablers and capabilities needed by a client enterprise seeking to deliver customer value.

7 Claims, 15 Drawing Sheets

| ISSUES<br>HYPOTHESES<br>QUESTIONS<br>DATA SOURCES | DATA FRAMEWORK | | SOURCES, I.E.: | | |
|---|---|---|---|---|---|
| HYPOS | QUESTIONS | REPORTS &<br>DOCUMENTS | EXECUTIVE<br>INTERVIEWS | EXISTING<br>RESEARCH | OTHER |
| ABC CO. HAS A MISSION, VISION, AND STRATEGY WHICH ARE EASILY UNDERSTOOD AND WIDELY KNOWN. | • HOW IS BUSINESS STRATEGY ESTABLISHED AND COMMUNICATED? WHAT ARE THE MISSION, VISION, GOALS & OBJECTIVES? | | | | |
| BUSINESS DECISIONS, GOALS AND OBJECTIVES ARE BASED UPON THESE AND ARE FOCUSED UPON MARKET SEGMENTS | • HOW ARE DECISIONS MADE REGARDING WHICH MARKET OPPORTUNITIES TO PURSUE? | | | | |
| | • HOW DO CURRENT STRATEGIES AND PROGRAMS MAP TO THE TARGET MARKETS' NEEDS/WANTS/VALUES? | | | | |
| HIGHEST VALUE/LEVERAGE MARKET SEGMENTS ARE IDENTIFIED & TARGETED. | • WHAT KEY MARKET SEGMENTS ARE IDENTIFIED? | | | | |
| | • HOW ARE SEGMENTS DETERMINED? I.E.: VALUE TO ABC CO.? COMMON NEEDS/BUYING BEHAVIOR? | | | | |
| | • WHO ARE THE TARGETED HIGH VALUE CUSTOMERS/SEGMENTS? (CURRENT AND FUTURE) | | | | |

FIG. 8A

| ISSUES<br>HYPOTHESES<br>QUESTIONS<br>DATA SOURCES | DATA FRAMEWORK | | | | |
|---|---|---|---|---|---|
| | | SOURCES, I.E.: | | | |
| HYPOS | QUESTIONS? | CLIENT INTERVIEWS/ WORKSHOPS | CUSTOMER COMPLAINT RECORDS | EXISTING RESEARCH/ SURVEYS | ADD'L RESEARCH, I.E.:<br>- CUST. INTERVIEWS<br>- FOCUS GROUPS<br>- SURVEYS |
| MOMENTS OF TRUTH (VALUE) ARE IDENTIFIED AND UNDERSTOOD | • WHAT ARE MOT INTERACTIONS WITHIN THE PROJECT SCOPE?<br>• WHICH ARE THE MOTS THAT CAN BE LEVERAGED TO DELIVER & COMPETE-ON VALUE TO THE CUSTOMER?<br>• WHO RECEIVES VALUE AT EACH MOT?<br>• "WHOSE" OPINION (BY SEGMENT) IS IMPORTANT REGARDING EACH MOT? I.E.: WHO IS AT THE POINT OF INTERACTION (USER)? WHO MAKES THE BUYING DECISION (APPROVER)? WHO INFLUENCES THE DECISION (REVIEWERS OR INFLUENCERS)? | | | | |
| NEEDS/WANTS ARE KNOWN BY MOT & SEGMENT (CUSTOMER VISION) | • WHAT ARE BASIC NEEDS (NOT MET=DRIVE ATTRITION)?<br>• WHAT ARE ATTRACTORS (IF MET=DRIVE SHARE)?<br>• WHAT ARE SATISFIERS (WHICH DRIVE SATISFACTION, BUT INDIVIDUALLY DO NOT AFFECT BEHAVIOR)? | | | | |

| ISSUES / HYPOTHESES / QUESTIONS / DATA SOURCES | DATA FRAMEWORK | | | | |
|---|---|---|---|---|---|
| | | | SOURCES, I.E.: | | |
| HYPOS | QUESTIONS? | CLIENT INTERVIEWS/ WORKSHOPS | CUSTOMER COMPLAINT RECORDS | EXISTING RESEARCH/ SURVEYS | ADD'L RESEARCH, I.E: - CUST. INTERVIEWS - FOCUS GROUPS - SURVEYS |
| CUSTOMER PRIORITIES & PERFORMANCE PERCEPTIONS ARE KNOWN (BY SEGMENT) | • WHAT IS CUSTOMER-PERCEIVED CLIENT PERFORMANCE OF EACH "NEED"? | | | | |
| | • WHAT IS ABC CO. PERFORMANCE GAP WITH COMPETITION? | | | | |
| | • WHAT ATTRIBUTES DIFFERENTIATE THE "BEST" COMPETITOR IN THE CUSTOMER'S MIND? | | | | |
| | • WHAT ARE CUSTOMERS "NEED" PRIORITIES (RANK/WEIGHT)? | | | | |
| ABC CO. PERFORMANCE IMPROVEMENT PRIORITIES ARE ESTABLISHED | • WHAT ARE CLIENT IMPROVEMENT PRIORITIES? (I.E.: HIGHLY IMPORTANT NEEDS WITH POOR PERFORMANCE OR GAPS). | | | | |
| | • WHICH BASIC NEEDS LAG MINIMUM CUSTOMER EXPECTATION (OR THE AVG INDUSTRY PERFORMANCE)? | | | | |
| | • WHICH ATTRACTORS LAG BEST COMPETITION (OR HAVE LITTLE/NO COMPETITIVE PERFORMANCE)? | | | | |
| | • WHICH SATISFIERS LAG AVERAGE INDUSTRY PERFORMANCE? | | | | |

| ISSUES HYPOTHESES QUESTIONS DATA SOURCES | DATA FRAMEWORK | | | | |
|---|---|---|---|---|---|
| | | SOURCES, I.E.: | | | |
| HYPOS | QUESTIONS | CROSS-FUNCTIONAL WORKSHOPS | CLIENT INTERVIEWS/ SURVEYS | SECONDARY RESEARCH/ LITERATURE SCAN | PRIMARY RESEARCH/ BENCH-MARKING |
| NECESSARY ABC CO. PROCESS CAPABILITIES ARE PRESENT | • WHAT PROCESS CAPABILITIES MUST BE PRESENT (TO MEET/DELIVER TARGETED CUSTOMER NEEDS)? | | | | |
| | • WHAT CAPABILITIES DISTINGUISH BOB (IN CLIENT INDUSTRY) AND WORLDCLASS (ANY INDUSTRY) COMPANIES? | | | | |
| | • WHAT IS CURRENT LEVEL/PRESENCE OF THESE (H/M/L)? (IDENTIFIES CLIENT CAPABILITY GAP TO BE CLOSED) | | | | |
| | • WHICH CAPABILITIES ARE ASSESSED AS "ZERO", "LOW" OR "MEDIUM" LEVEL OF PRESENCE (VERSUS HIGH OR IDEAL)?* | | | | |
| REQUIRED ABC CO. INFRASTRUCTURE ENABLERS ARE PRESENT | • WHAT ARE THE/THEIR REQUIRED INFRASTRUCTURE ENABLERS? | | | | |
| | • WHAT ENABLERS ALSO DISTINGUISH BOB/WC CO'S? | | | | |
| | • WHAT IS CURRENT PRESENCE (H/M/L/0) OF ABOVE ENABLERS? | | | | |

* NOTE: WHEN DOING PROCESS IMPROVEMENT, ANALYZE ONLY THE POOR PERFORMING (M/L/0) CAPABILITIES... BUT, WHEN REENGINEERING A NEW PROCESS DESIGN, ALSO INCLUDE THE HIGH PERFORMING CAPABILITIES (AS THEY MUST ALSO BE ENABLED IN THE NEW DESIGN).

FIG. 8D

| ISSUES<br>HYPOTHESES<br>QUESTIONS<br>DATA SOURCES | DATA FRAMEWORK | | | | |
|---|---|---|---|---|---|
| | | SOURCES, I.E.: | | | |
| HYPOS | QUESTIONS | CROSS-<br>FUNCTIONAL<br>WORKSHOPS | FINANCE<br>ORG. FOR<br>SIZING | I/T<br>ORG. FOR<br>SIZING | EXECUTIVE<br>INTERVIEWS/<br>WORKSHOPS |
| CUSTOMER-DEFINED<br>INFRASTRUCTURE<br>IMPROVEMENTS/<br>INVESTMENTS ARE<br>IDENTIFIED AND<br>PRIORITIZED | • WHICH ARE THE CURRENT M/L/O ENABLERS?<br>• HOW DO THEY CLUSTER INTO LOGICAL PROJECTS, I.E.:<br>  – A CLUSTER OF SIMILAR ENABLERS, SUCH AS<br>    SEVERAL BUSINESS PRACTICE CHANGES, OR<br>  – A GROUP OF ENABLERS TO DELIVER A CAPABILITY<br>• WHAT IS THE RELATIVE COST VS BUSINESS BENEFIT<br>  OF THE DIFFERENT POTENTIAL PROJECTS?<br>• WHAT ARE THE PRIORITIZED RECOMMENDED ACTIONS?<br>  (FOR HIGHEST CUSTOMER VALUE AND CLIENT BENEFIT?) | | | | |

FIG. 8E

| ISSUES HYPOTHESES QUESTIONS DATA SOURCES | DATA FRAMEWORK | | SOURCES, I.E.: | | |
|---|---|---|---|---|---|
| | | | REVIEW REPORTS/ PROCESS | EXECUTIVE INTERVIEWS | OTHER |
| | HYPOS | QUESTIONS | | | |
| AN ON-GOING PROCESS IS IN PLACE TO USE CUSTOMER VALUE TO DRIVE BUSINESS DECISIONS | | • HOW ARE CUSTOMER NEEDS/WANTS/VALUES IDENTIFIED? | | | |
| | | • HOW DO CUSTOMER VALUE AND PERFORMANCE PERCEPTION DRIVE INVESTMENTS AND RESOURCE ALLOCATION?<br>— WHAT IS THE MANAGEMENT DECISION SYSTEM?<br>— HOW ARE INVESTMENT PRIORITIES DETERMINED?<br>— IS CUSTOMER-FEEDBACK AN ACTION "DRIVER"? | | | |
| | | • WHAT IS THE CLOSED-LOOP SATISFACTION PROCESS?<br>— ARE IMPLEMENTED IMPROVEMENT ACTIONS SURVEYED TO DETERMINE CUSTOMER IMPACT?<br>— HOW ARE NEW/EMERGING CUSTOMER NEEDS ID'D?<br>— ARE COMPETITIVE PERCEPTIONS MONITORED?<br>— ARE COMPLAINTS ANALYZED FOR TRENDS?<br>— ARE CUSTOMER SERVICE REQUESTS ANALYZED?<br>— HOW ARE THE ABOVE LOOPED BACK INTO THE MANAGEMENT SYSTEM TO ADJUST INFRASTRUCTURE? | | | |

FIG. 8F

| HYPOTHESES | KEY QUESTIONS | SOURCES | | | |
|---|---|---|---|---|---|
| | | EXISTING DATA | INTERVIEWS | FOCUS GROUPS | SURVEYS |
| CUSTOMER NEEDS & WANTS ARE KNOWN | HOW DOES GREENBACK DETERMINE CUSTOMER REQUIREMENTS? | NOT CURRENT | AD HOC | NEEDED | NEEDED |
| | WHAT CUSTOMER REQUIREMENTS DATA EXISTS? | NOT AVAILABLE | NOT CURRENT | NEEDED | NEEDED |
| | HOW DOES GREENBACK DETERMINE CUSTOMER PERFORMANCE PERCEPTIONS AND SATISFACTION? | NOT AVAILABLE | | NEEDED | NEEDED |
| OTHER HYPOS | WHAT DATA EXISTS? WHO AND HOW IS IT USED? | NOT AVAILABLE | | NEEDED | NEEDED |

FIG. 9

CUSTOMER RELATIONSHIP MANAGEMENT BUSINESS METHOD

FIELD OF THE INVENTION

The present invention generally relates to management consulting and, more particularly, to a business method focused on the business theme of profitable customer relationships.

BACKGROUND OF THE INVENTION

Building profitable customer relationships is a complex business process that requires a multi-disciplinary and holistic approach. Existing methods are based upon either an inside-out approach and/or a single competency, for example Customer Relationship Management (CRM), Business Intelligence (BI) or Customer Value Management (CVM). However, to achieve the goal of profitable customer relationships, it is necessary to (a) know who the customers are (based on BI), (b) how to interact and collaborate with them (based upon CRM), and (c) define customer value using an outside-in approach (based on CVM). Traditional approaches have focused on internal factors, such as increasing employees' productivity so that they can service more customers, or streamlining and optimizing a telephony enablement technology so that a call center can support more inbound customer calls. These approaches have typically ignored the view of the customer.

The electronic market place and e-business made possible by the Internet have increased the need for companies to capture and retain loyal customers. Consumers now have more choices and access to information for making decisions, so that they are in a stronger position to decide with whom and how they want to do business. Furthermore, since consumers can now view competitors with a simple mouse click, the cost of switching loyalties decreases, resulting in a dramatically more competitive environment for capturing and retaining loyal customers. This in turn has led to a need to rethink the traditional CRM processes (based upon call center, sales force automation and marketing campaign management) that are organized around internal employee productivity (usually called the inside-out perspective). Hence, traditional business models for CRM are changing; in particular, the focus has changed from providing customer services (passive, outside-in approach) to one based upon building profitable customer relationships (active, outside-in approach).

CRM has attracted great attention recently because of the new economy companies and the Internet. As the e-business market matures and starts to focus on profitable customer relationships rather than customer service and channel management, it will become increasingly important that companies have an effective business method for building such relationships.

SUMMARY OF THE INVENTION

It is therefore an object of the present invention to provide a holistic approach to a business method for profitable customer loyalty.

According to the invention, there is provided a business method (characterized as the Loyalty Suite business method) focused on the theme of profitable customer relationships. This method is based on a combination of the CRM, BI and CVM competencies. The practice of the method includes (a) construction of an engagement model, followed by (b) phases, (c) activities, (d) tasks, (e) generation of work products, and (f) generation of technique papers.

The Loyalty Suite approach is to take a customer-centric view using a customer management perspective that integrates CRM operational processes, customer collaboration touchpoints and CRM analytical processes. It is this outside-in perspective and the techniques for determining customer loyalty that distinguish the Loyalty Suite from other CRM approaches. Practice of the Loyalty Suite method permits identification of those factors which engender loyalty from a customer perspective. This then determines the enablers and capabilities needed to (a) deliver loyalty-based customer value through a client's processes and/or channels, and (b) execute an on-going management system.

The customer-centric approach used by the Loyalty Suite creates a perspective based upon the value customers receive from a product, service or process. This in turn leads to the identification and prioritization of critical interactions to further define opportunities to create customer satisfaction or dissatisfaction.

Customer Value Management (CVM) is the core of the Loyalty Suite business method. It provides the techniques for:

- optimized customer-focused strategies, plans and programs;
- determination of cross-functional customer-focused processes;
- customer segmentation and analysis resulting in a Customer Value Index;
- identification of Customer Value Management processes; and
- prioritized loyalty building contact points.

These are supported using hypotheses and data frameworks for testing hypotheses, templates to structure the analysis, examples of how to do particular tasks and technique papers of best practices.

The outcome of the CVM process is the identification of the few critical customer value processes that must be performed, and which the business systems must be capable of performing in order to create satisfied, loyal customers. The need for these customer value processes leads in turn to dependencies and prerequisites that must be present in the infrastructure to support or enable essential capabilities; for example, organization/people, skills/resources, policies/practices, information, information technology and management/management systems.

This is done using techniques that focus on attractors and differentiators for high priority customer needs that primarily influence customer behavior to generate loyalty.

The business method for the Loyalty Suite is a set of pre-defined activities and tasks that are structured for repeatability. The method therefore offers the ability to deliver in a consistent fashion with predictable results. The business method contains three engagement models, for (1) assessing and developing a customer loyalty strategy and roadmap, (2) process and channel optimization and (3) defining a loyalty management system.

The Loyalty Suite business method of the present invention has several distinctive characteristics. These include:

- repeatable engagement models;
- engagement templates containing instances of best practices and benchmarking data;
- focused activities that leverage business intelligence, CRM and CVM competencies that produce a customer management result for profitable, loyal relationships;

a work breakdown structure that decomposes a series of complex tasks to support the customer-centric approach and its use of CVM techniques and best practices; and the use of examples, templates and technique papers, so that the Loyalty Suite is a work-product-based method.

Several tools are part of the Loyalty Suite business method. These include:

an automated environment for downloading engagement models and their associated engagement templates to the engagement teams (at the end of each engagement, this environment will also be able to upload the engagement team's work for intellectual capital harvesting and hardening purposes);

automated tools used by the data framework to test hypotheses; and visual tools for automating the mapping and comparing of a client's existing and desired capabilities, with reference to "best practices" (the resulting "loyalty index" is used to help determine the next steps for a client).

The Loyalty Suite business method has the following specific advantages:

The Loyalty Suite provides a business method for planning, targeting and managing profitable customer relationships, taking into account all the processes necessary to achieve customer loyalty, as opposed to the current market approach based upon a single competency (whether that be CRM, BI or CVM).

The Loyalty Suite business method uses benchmarking data and industry best practices to provide industry-specific criteria for measuring performance. In addition, the Loyalty Suite business method is based upon repeatable and reusable engagement models.

BRIEF DESCRIPTION OF THE DRAWINGS

The foregoing and other objects, aspects and advantages will be better understood from the following detailed description of a preferred embodiment of the invention with reference to the drawings, in which:

FIGS. 8A to 8F are matrices illustrating an example of hypotheses and data framework for a typical client;

FIG. 9 is a matrix of data sources used to collect facts and findings; and

DETAILED DESCRIPTION OF A PREFERRED EMBODIMENT

The following terms are used frequently within this document and are key concepts in the SCI (Solution Consulting and Integration) methodology.

Activity: A grouping of similar tasks, used to sequence work during an engagement.

Client: The organization or person contracting for services related to the Loyalty Suite offering features.

Customers: Individuals or groups that do business with clients. Customers thus have relationships with clients.

Data Point: Information discovered during the engagement.

Deliverable: A work product or set of work products provided to the client.

Finding: A conclusion developed based on analysis of data points.

Hypothesis: Tentative conclusions phrased as assertions. Hypotheses should be proved or disproved based on data points.

Method Exponent: A person who possesses methodology expertise and assists with the application of the methodology throughout the engagement. The Method Exponent:

(1) defines method adaptations required to meet specific engagement or customer requirements through the Methodology Adoption Workshop;

(2) works with the Engagement Manager to develop the engagement plan and define resource requirements and skills;

(3) provides on-site mentoring to engagement team (as a billable resource) regarding content of work products to be produced, method to produce them, techniques, etc;

(4) identifies and coordinates the methodology improvements with the method development team.

Recommendation: A suggestion for improvement or continued success based on findings developed during the engagement.

Sample: An instance of a work product produced during a client engagement.

Task: Unit of work required to produce a work product.

Technique: A guide for performing a task and/or developing a work product.

Template: A predefined format which may be reused develop a work product.

Work Product: A tangible artifact produced during an engagement as a result of one or more tasks. The work product is not necessarily the same as a deliverable; it may be an intermediate product not delivered to the client. Note that the Work Product descriptions provided within the methodology are guidelines for the contents of the work products. They are not the actual work products.

Figure 1:
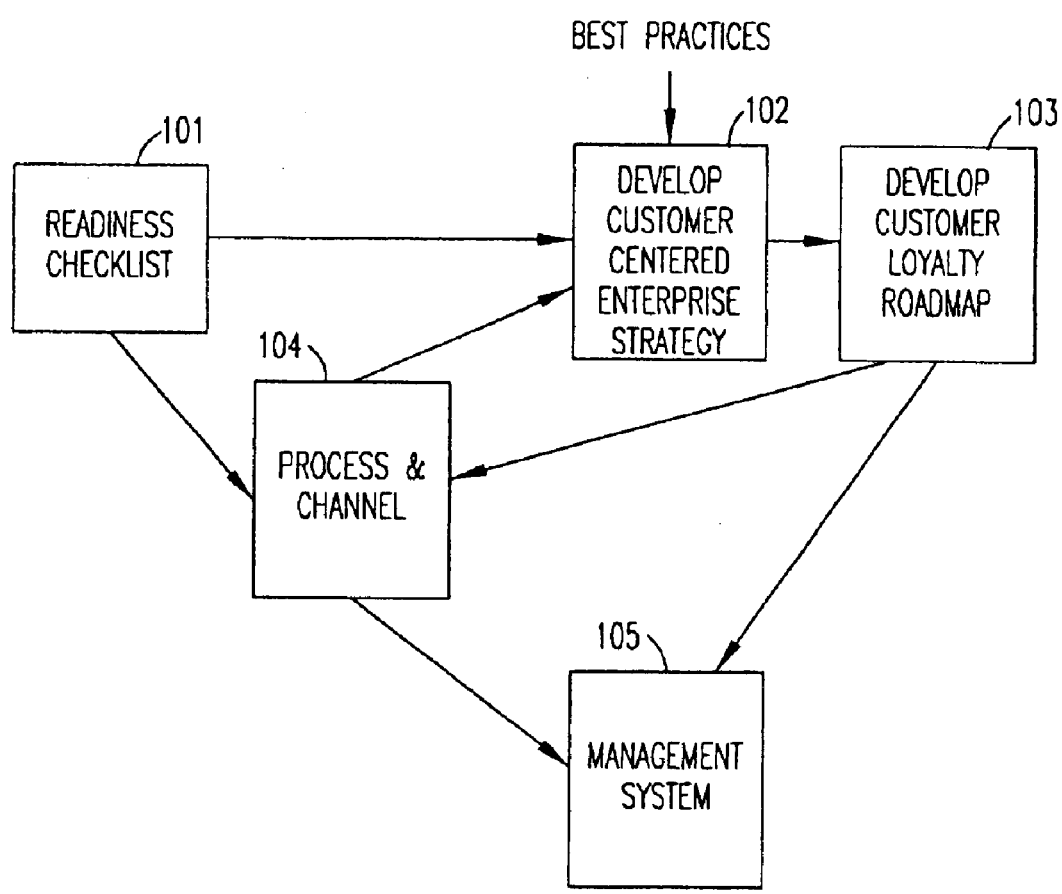
FIG. 1 is a block diagram of the Loyalty Suite according to the invention, showing its three offerings that break down into three engagement models with a total of five phases.

Referring now to the drawings, and more particularly to FIG. 1, there is shown the Loyalty Suite according to the invention. The Loyalty Suite business method is based upon three engagement models. These are:

I. Customer Loyalty Strategy and Roadmap

II. Customer Focused Process and Channels

III. Loyalty Management System

An overview of the three engagement models is shown in FIG. 1. The first engagement model includes three phases; Phase A, denoted 101, define/gather required data to develop a readiness checklist; Phase B, denoted 102, develop a customer-centered strategy; and Phase C, denoted 103, develop a customer loyalty roadmap. The process progresses from Phase A to Phase B to Phase C, with a "best practices" input to Phase B. The second engagement model 104 includes the customer focused processes and channels. This model receives input from Phase A, 101, and Phase C, 103, and provides input to Phase B, 102. The third engagement model 105 is a management system for generating the customer value index. This model receives input from the second model 104 and Phase C, 103.

Each of the three engagement models can be used in a "plug-and-play" fashion to create an end-to-end business method for creating and supporting a customer loyalty system. In addition, each of the engagement models and their corresponding phases can be used as an independent, standalone method.

The engagement models for the Loyalty Suite business method are structured according to phases, activities, tasks and the work products/deliverables that are associated with each task. The tables that follow show this work breakdown structure and the relationship between each of the engagement models, their respective phases, activities, the tasks for each activity and their outputs in the form of work products/deliverables.

Figure 2:
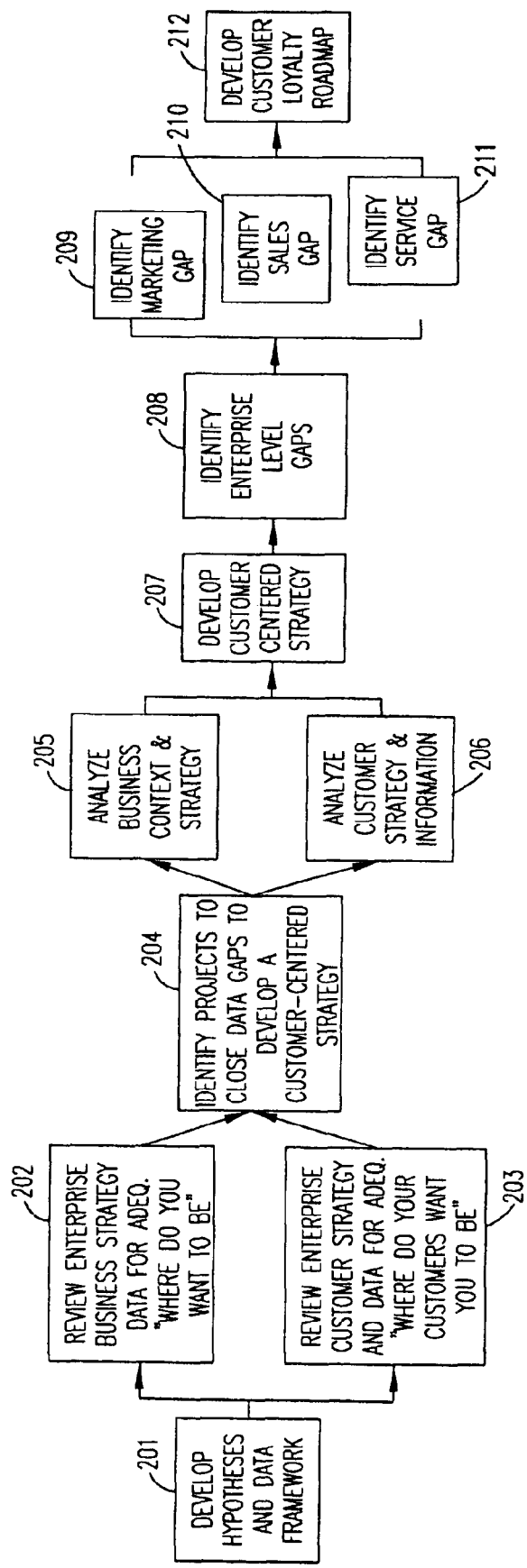
FIG. 2 is a flow chart of the process for developing a customer loyalty roadmap in three phases.

Details of the first engagement model (the Customer Loyalty Strategy and Roadmap engagement model) are shown in FIG. 2. In the process outlined in FIG. 2, a strategy is developed for attracting and retaining customers based upon the business requirements and the customer needs.

In the process shown in FIG. 2, the activities in Phase A are to define and gather required data. This phase identifies the data required to develop a Customer-Centered Strategy. The process begins by developing hypotheses and a data framework in step 201. The required data covers both the Enterprise Business Strategy ("Where does the organization want to be?") and the Enterprise Customer Strategy ("Where does the customer want the organization to be?"). These strategies and their supporting data are reviewed in steps 202 and 203 respectively. In step 204, data gaps are identified and project recommendations are formed showing the time lines and initiatives for both the client and the business. A proposal is created for the initiatives assigned to the business to gather the missing data.

The key activities of this phase to support the Loyalty Suite business method are:

(1) Review Business Strategy Data ("Where do you want to be?): review the enterprise business strategy data for adequacy and ensure that the data is robust enough to help create the Customer Centered Strategy.

(2) Review Customer Strategy and Data ("Where do your customers want you to be?"): review the enterprise customer strategy data for adequacy and ensure that the data (a) is robust enough to help create (or confirm the existence of) an ideal Customer-Centered Strategy and (b) will satisfy the requirements for data in the engagement hypotheses and data framework.

(3) Identify Projects to close data gaps to develop a Customer-Centered Strategy: identify interim projects to obtain missing data and to propose where the client needs assistance. This activity is not required if quantitative external market research is not included within the scope of the engagement.

These activities are tabulated in Table 1.

TABLE 1

Tasks and Work Products for Readiness, Phase A.

| Activity | Task | Work Product |
|---|---|---|
| Develop Hypotheses and Data Framework | Create Hypotheses and Data Framework Request and Gather Documentation from Client | Hypotheses and Data Framework Baseline Survey |
| Review Enterprise Business Strategy and Data for Adequacy "Where do you want to be?" | Gather Business Driver Data from Client Gather Business Environment Data from Client Gather Strategic Direction Data from Client Gather Strategic Market Position Data from Client | Business Drivers Business Environment Strategic Direction Strategic Market Position |
| Review Enterprise Customer Strategy and Data for Adequacy: "Where do customers want you to be?" | Gather Customer Segmentation Data from Client Gather Targeted Touchpoint Data from Client Gather Customer Wants and Needs Data from Client Gather Customer Targeted Wants and Needs from Client Gather Customer Feedback Data from Client Gather Current Customer Strategy Documentation | Customer Segmentation Targeted Customer Touchpoints Customer Wants and Needs Targeted Wants and Needs Baseline Survey Baseline Survey |
| Identify Projects to close data gaps to develop a Customer-Centered Strategy | Identify Projects to close Business and Customer Data Gaps Create Proposal for work | Project Recommendation Proposal |

Phase B is the development of a Customer-Centered Strategy. This phase combines analyses of the client's business strategy (and supporting data) and customer data to determine an appropriate customer-centered strategy framework and its detailed components. This includes elements to address and support (as appropriate) the following client concerns: (a) business strategic direction (considering the related business environment, business drivers, and strategic market positioning); (b) "Customer Maturity Curve" positioning, e.g. mass market, customer segment, or tailored/personalized delivery of value; (c) customer segmentation and targeting; (d) on-going identification of dynamic customer needs; (e) on-going alignment of business delivery capabilities/infrastructure with changing market needs; (f) management of long-running, individual customer relationships; (g) management of profitable, tailored/personalized customer service; and (h) Customer Loyalty Management.

As shown in FIG. 2, the results of step 204 are used to analyze business context and strategy (step 205) and analyze customer strategy and information (step 206). Based on these analyses, a Customer-Centered strategy is developed in step 207. The key activities of this phase to support the Loyalty Suite business method are:

(1) Analyze Business Strategy and Data: analyze the enterprise business strategy and related business context data to determine their impacts on (and requirements for) an ideal Customer-Centered Strategy.

(2) Analyze Customer Strategy and Data: determine both the business- and the customer-defined design points for a new, Customer-Centered Strategy, and/or determine the adequacy of the existing customer strategy.

(3) Develop Customer-Centered Strategy: develop a customer-centered strategy that ideally aligns with and supports the enterprise business strategy.

These activities are tabulated in Table 2.

TABLE 2

Tasks and Work Products for Developing Customer-Centered Enterprise Strategy, Phase B.

| Activity | Task | Work Product |
|---|---|---|
| Analyze Business Strategy and Data | Analyze Business Driver Data | Business Driver |
| | Analyze Business Environment Data | Business Environment |
| | Analyze Strategic Direction | Strategic Direction |
| | Analyze Strategic Market Position | Strategic Market Position |
| Analyze Customer Strategy and Data | Analyze Customer Segmentation Data | Customer Segmentation |
| | Analyze Targeted Touchpoints Data | Targeted Customer-Audience Touchpoints |
| | Analyze Customer Wants and Needs | Customer Wants and Needs |
| | Analyze Customer Wants and Needs Targeted for Investment | Customer Wants and Needs |
| | Analyze Customer Feedback (Satisfaction Survey, Complaint Log) | Customer Feedback |
| | Analyze current customer strategy | Baseline Survey |
| | Create Interim Report (of findings) | Interim Report |
| Develop Customer-Centered Strategy | Align Customer Requirements with Business Direction | Strategic Fit Assessment |
| | Select Hypotheses from "CRM Best Practices" Capabilities and Enablers | Hypotheses and Data Framework |
| | Craft Additional Hypotheses from Client-specific and/or Customer-defined Capabilities and Enablers | Capability Model, Capability Enablers |
| | Define Scope of Enterprise Processes | Process Identification |
| | Define Enterprise Architecture Overview | Architecture Overview Diagram |
| | Create Customer Centered Strategy Documentation | Final Report |
| | Develop Business Case for Strategy | Business Case, Final Report |

In Phase C the Customer Loyalty Roadmap is developed. This phase takes into account the client's existing initiatives and the existing business capabilities to define the required enablers. An assessment is conducted against each of the enablers (Process, organization, and Technology) to identify the gaps in achieving the Customer-Centered Strategy—that is, areas where the marketing, sales and service aspects of the enterprise are deficient with regard to one or more of the enablers. Initiatives are defined and quantified in step 208 (e.g., Cost, Schedule, Priority, Benefit, etc.). A high level Business Case is developed by identifying marketing process gaps (step 209), identifying sales process gaps (step 210), and identifying service process gaps (step 211). Finally, a Roadmap is developed in step 212, outlining the initiatives required to achieve the Customer-Centered Strategy.

The key activities of this phase to support the Loyalty Suite Business method are as follows:

(1) Identify Enterprise-Level (Cross-process) Gaps versus Best Practices: define the those business capabilities and enablers which the client wishes to target for action. This Enterprise-Wide (or Business-Unit-Level) assessment activity is only for the hypotheses relating to critical Cross-Process capabilities and/or infrastructure. Using the hypotheses of derived CVM and/or CRM business capabilities and enabling infrastructure previously identified in the "Customer Centered Strategy" phase of the Loyalty Suite (strategy hypotheses that desired capabilities and infrastructure exist), work with the client is done to (a) determine the extent to which those cross-process capabilities currently exist within the client business; and (b) determine the extent to which the cross-process enabling infrastructure (processes, organization and technology infrastructure) exists in the client business.

(2) Identify Marketing Process Gaps Against Best Practices: using the hypotheses identified in the "Customer Strategy" phase of the Loyalty Suite (hypotheses that best practices exist), work with the client is done to (a) determine the extent to which the Marketing Process related capabilities currently exist; and (b) determine the extent to which the Marketing Process enabling infrastructure (processes, organization and technology infrastructure) exists in the client business.

(3) Identify Sales Process Gaps against Best Practices: Using the hypotheses identified in the "Customer Strategy" phase of the Loyalty Suite (hypotheses that best practices exist), work with the client is done to (a) determine the extent to which the Sales Process related capabilities currently exist; and (b) determine the extent to which the Sales Process enabling infrastructure (processes; organization and technology infrastructure) exists in the client business.

(4) Identify Service Process Gaps: using the hypotheses identified in the "Customer Strategy" phase of the Loyalty Suite (hypotheses that best practices exist), work with the client is done to (a) determine the extent to which the Service Process related capabilities currently exist; and (b) determine the extent to which the Service Process enabling infrastructure (process, organization and technology infrastructure) exists in the client business.

(5) Develop Customer Centered Roadmap: develop a Customer Loyalty Roadmap that the client can implement to achieve the objectives of the Customer-Centered Strategy.

These activities are tabulated in Table 3.

TABLE 3

Tasks and Work Products for Developing Customer Loyalty Roadmap, Phase C.

| Activity | Task | Work Product |
|---|---|---|
| Identify Enterprise-Level Gaps vs. Best Practices | Assess Existing Enterprise (Cross-Process Capabilities) | Capability Assessment |
| | Assess Existing Enterprise (Cross-Platform Infrastructure) | Current Organization Assessment |
| Identify Marketing Process Gaps | Assess Existing Marketing Process Capabilities and | Capability Model Capability Enablers |
| | Assess Existing Marketing Process Infrastructure | |
| Identify Sales Process Gap | Assess Existing Sales Process Capabilities and | Capability Model Capability Enablers |
| | Assess Existing Sales Process Infrastructure | |
| Identify Service Process Gap | Assess Existing Service Process Capabilities and | Capability Model Capability Enablers |
| | Assess Existing Service Process Infrastructure | |

TABLE 3-continued

Tasks and Work Products for Developing Customer Loyalty Roadmap, Phase C.

| Activity | Task | Work Product |
|---|---|---|
| Other Processes | (Can be done for other process as required) | |
| Develop Customer Loyalty Roadmap | Allocate Enterprise Gaps by Process | Capability Model |
| | Assess existing Client Initiatives | Client Initiatives |
| | Define Initiatives | Strategic Roadmap |
| | Define impact of initiatives | Strategic Roadmap |
| | Analyze Risk | Risk Analysis |
| | Update Business Case | Business Case |
| | Update Strategic Fit Assessment | Strategic Fit Assessment |
| | Develop Customer Loyalty Roadmap | Strategic Roadmap |
| | Prioritize Initiatives with Client | Preliminary Cost Benefit Estimation |
| | Finalize Customer Loyalty Roadmap | Strategic Roadmap |
| | Update Business Case | Business Case |

Figure 3:
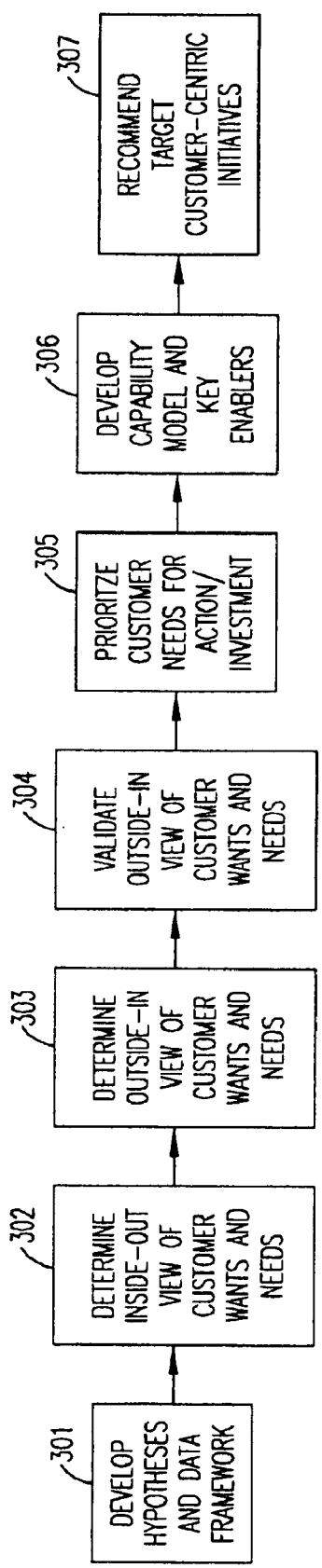
FIG. 3 is a flow chart of the engagement model showing customer focused processes and channels.

The Customer Focused Processes and Channels engagement model is shown in more detail in FIG. 3. By executing the process outlined in FIG. 3, the client is enabled to differentiate and attract and retain customers based upon the value provided during key interactions (touchpoints), using customer-facing processes or channels. This process also enables the implementation of an outside-in, customer-defined perspective (e.g., segment-based or personalized, individual-customer-based). This work includes:

(1) Utilizing existing process or channel-specific segmentation and determining an outside-in, customer-defined vision of ideal value delivery at key touchpoints, including customer performance perceptions, and competitive gaps;

(2) Identifying business process and/or channel capabilities, organization and infrastructure required to consistently deliver the customer's process or channel vision, needs and wants;

(3) Providing a gap analysis versus current process or channel capabilities and infrastructure; and (4) Recommending process, organization, and/or technology projects and initiatives: (a) Quickly-performed projects for immediate benefits, and (b) Longer term, major projects.

The process shown in FIG. 3 begins with development of a framework including hypotheses and data (step 301). An inside-out view of customer expectations (wants and needs) is determined in step 302. This is followed by determining an outside-in view of customer wants and needs in step 303. The outside-in view of customer expectations (wants and needs) is validated in step 304. Customer needs are prioritized for action/investment in step 305. A capability model and key enablers are developed in step 306. This leads to a recommendation of target Customer-Centric initiatives in step 307. The key activities of this engagement model to support the Loyalty Suite business method are:

(1) Develop Framework including Hypotheses and Data: identify and educate the core team and secure commitment to the common approach and plans used to execute the engagement. In addition, hypotheses are solidified and a process is begun to identify the sources and the adequacy of existing data required to fulfill the engagement objectives and hypotheses. The data framework specifies the sources of information identified during the kickoff meeting or interviews with key client stakeholders and reviews of existing client business and customer information documentation.

(2) Determine Inside-Out view of Business Environment and Customer Needs: the objective of this activity is to understand the client's business environment and the potential benefits and linkages between the engagement and the client's business strategy, goals, objectives and issues. The client's understanding of the key customer interaction points and customer wants and needs are also determined. The information needed to perform the business environment analysis is gathered in interviews and workshops with various client personnel.

(3) Determine Outside-In view of Customer Wants and Needs: Customer segmentation is performed to produce a data framework. Focus groups are prepared; the moments of truth are validated and prioritized, to yield the targeted customer-audience touchpoints. The customer wants and needs are identified using this information.

(4) Validate Outside-In view of Customer Wants and Needs: A quantitative survey is designed, and quantitative market research is conducted. The results of this research are analyzed and summarized, and a final report is produced.

(5) Prioritize Customer Needs for Action/Investment: the external customer viewpoint is reconciled with the client's brand image, business strategy and the goals of the engagement. Customer needs to be targeted for action are also determined.

(6) Develop Capability Model and Key Enablers: identify the client's business capabilities and infrastructure required to provide the targeted customer needs identified during the "Target Customer Needs for Action/.Investment" activity.

(7) Recommend Target Customer-Centric Initiatives: all of the data discovered during this engagement is used to develop a prioritized set of final recommendations for improvement projects.

These activities are tabulated in Table 4.

TABLE 4

Customer Focused Processes and Channels

| Activity | Task | Work Product |
|---|---|---|
| Develop Hypotheses and Data Framework | Create Hypotheses and Data Framework | Hypotheses and Data Framework |
| | Request and Gather Documentation from Client | Baseline Survey |
| Determine Inside-Out View of Customer Wants and Needs | Conduct Interview and Workshops with Stakeholders | Interview Notes |
| | Understand Client Business Goals and Linkages to Project | Strategic Fit Assessment |
| | Identify Client's View of Moments of Truth | Targeted Customer-Audience Touchpoints |
| | Determine Adequacy of Data and Update Date Framework regarding Missing Data | Data Framework |
| Determine Outside-In View of Customer Wants and Needs | Develop Customer Segmentation | Customer Segmentation, Data Framework |

TABLE 4-continued

Customer Focused Processes and Channels

| Activity | Task | Work Product |
|---|---|---|
| | Prepare Focus Groups | Meeting Documentation |
| | Validate and Prioritize Moments of Truth | Targeted Customer-Audience Touchpoints |
| | Identify Customer Wants and Needs | Customer Wants and Needs |
| Validate Outside-In View of Customer Wants and Needs | Design Quantitative Survey | |
| | Conduct Quantitative Market Research | Customer Wants and Needs |
| | Analyze and Summarize Market Research | Final Report |
| Prioritize Customer Wants and Needs for Action/Investment | Review Quantitative Survey Results with Client | Briefed Team |
| | Compare Internal Client View to Customer View | Customer Wants and Needs |
| | Align Business Goals and Objectives with Top Customer Wants and Needs | Strategic Fit Assessment |
| | Develop Interim Report | Interim Report |
| Develop Capability Model and Key Enablers | Prepare for Value Management Workshop | Meeting Documentation |
| | Identify and Assess Essential Capabilities | Capability Model |
| | Identify and Assess Key Enablers | Capability Enablers |
| Recommend Customer-Centric Initiatives | Prioritize Opportunities | Critical Issues Opportunities and Recommendations |
| | Compile Final Report | Final Report |

Figure 4:
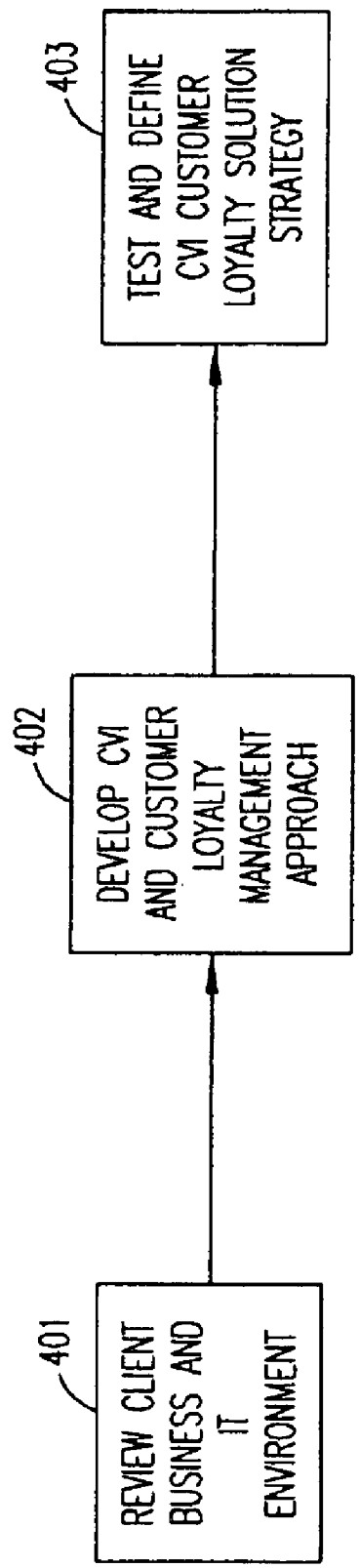
FIG. 4 is a flow chart of the engagement model showing the customer value index (CVI)

The Customer Loyalty Management System 105 provides a blueprint or roadmap for becoming customer centered. It develops a prioritized set of manageable project initiatives in support a client's desired Customer Loyalty capabilities. Based on the key measures and supporting data for each initiative, a composite index of customer value is developed, resulting in the creation of a Customer Value Index, as shown in FIG. 4. A closed-loop cycle is proposed for the index to be embedded into existing business processes to change behavior at customer interaction points. Finally, a test environment tests the index based on actual client data. This work includes:

(1) Confirmation of the client's customer loyalty capabilities.

(2) Translating and aligning strategies and goals into a balanced set of indicators for customer loyalty.

(3) Developing key measures, gathering supporting data for each initiative and developing a composite customer value index.

(4) Identifying and segmenting customers based on their "loyalty" and "value" to the client using data mining techniques. The mining techniques are used to discover what factors reflect customer loyalty and value. The analysis process uses available client customer, sales and service history information as well as external demographic data. The information is analyzed using data mining techniques.

(5) Assessing the informational technology environment for Customer Value Index.

(6) Creating a Customer Value Index graphical user interface (GUI) prototype, based on a client application selected as part of this engagement.

As shown in FIG. 4, the Customer Value Index process begins with a review of the client's business and information technology (IT) environment in step 401. Based on this review, a Customer Value Index (CVI) and customer loyalty management approach is developed in step 402. Finally, the CVI and customer loyalty solution strategy are tested in step 403. The key activities of this engagement model to support the Loyalty Suite business method are:

(1) Review Client Business and IT Environment: understand the client's business, organization and IT environment in preparation for defining (a) a Customer Value Index (CVI) and (b) Customer Loyalty Management (CLM) opportunities.

(2) Develop CVI and Customer Loyalty Management Approach: confirm the client's consensus on the definitions of each capability and breaks down the desired capabilities into manageable project initiatives. Based on the key measures and supporting data for each initiative, a composite index of customer value is developed. A closed-loop cycle is proposed (as opposed to implemented), where the index is embedded into existing business processes to change behavior at customer interaction points.

(3) Test and Define Customer Loyalty Management Approach: project initiatives are prioritized based on CVI and data quality test results and other measures of cost/benefit. In addition, the overall CVI solution strategy for each of the top CVI project initiatives is defined.

These activities are tabulated in Table 5.

TABLE 5

Customer Value Index

| Activity | Task | Work Product |
|---|---|---|
| Review Client Business and IT Environment | Confirm Business Context | Business Environment |
| | Confirm Customer Wants and Needs | Customer Wants and Needs |
| | Confirm Business Issues and Goals | Strategic Direction |
| | Confirm Current Organization | Current Organization Description |
| | Confirm Client Business and Environment | Business Environment |
| | Confirm Current Information Systems Environment | Current IT Environment |
| | Identify Client's Internal View of Customer Needs | Customer Wants and Needs |
| Develop Customer Value Index (CVI) and Customer Loyalty Management Approach | Confirm Opportunities and Desired Capabilities | Capability Model |
| | Confirm Capability Enablers | Capability Enablers |
| | Confirm Capability Gaps, Shortcomings and Deficiencies | Capability Assessment |
| | Define Solution Areas (CRM) Determine Business Units included in Analysis Develop CVI Key Measurements Determine Required Data Sources and Elements to | Solution Areas |

TABLE 5-continued

Customer Value Index

| Activity | Task | Work Product |
|---|---|---|
| | support key CVI measures | |
| | Develop High Level Subject Area Model (BI) | Subject Area Model |
| | Develop CVI and Loyalty Management Approach | Business Event List, Future Process/ Function Attributes, Prototype Environment |
| | Construct CVI | |
| | Propose Loyalty Management Process | |
| | Establish Environment to Test Loyalty Management Approach | |
| Test and Define "CVI for Customer Loyalty" | Formulate a Cost/Benefit Impact Analysis (BI) | Benefit Impact Analysis |
| | Validate Solution Area Business Case | Business Case |
| | Conduct Solution Area Data Discovery: | Data Migration Maps, External Data Reference Assessment, Logical Data Model, Physical Database Design, User Interface Prototype |
| | Construct CVI | |
| | Propose Loyalty Management Process | |
| | Establish Environment to Test Loyalty Management Approach | |
| | Document Results of CVI Analysis | Critical Issues Opportunities and Recommenda- tions |
| | Confirm Project Initiatives | Solution Areas Release Plan |
| | Develop Project Initiatives Release Plan | |

The formulation of the hypothesis and data framework involves a set of activities at the core of the Loyalty Suite business method, since in these activities the practitioner collects, defines, tests and validates the readiness of a client to develop a customer loyalty strategy and measure them against best practices. The examples in these charts apply to the Readiness Phase A activity (Develop Hypothesis and Data Framework) shown in FIG. 5. These examples are used to illustrate the process, but this process can be used in multiple ways to test and validate best practices hypotheses. This process can also be automated using a visual tool with a database.

Figure 5:
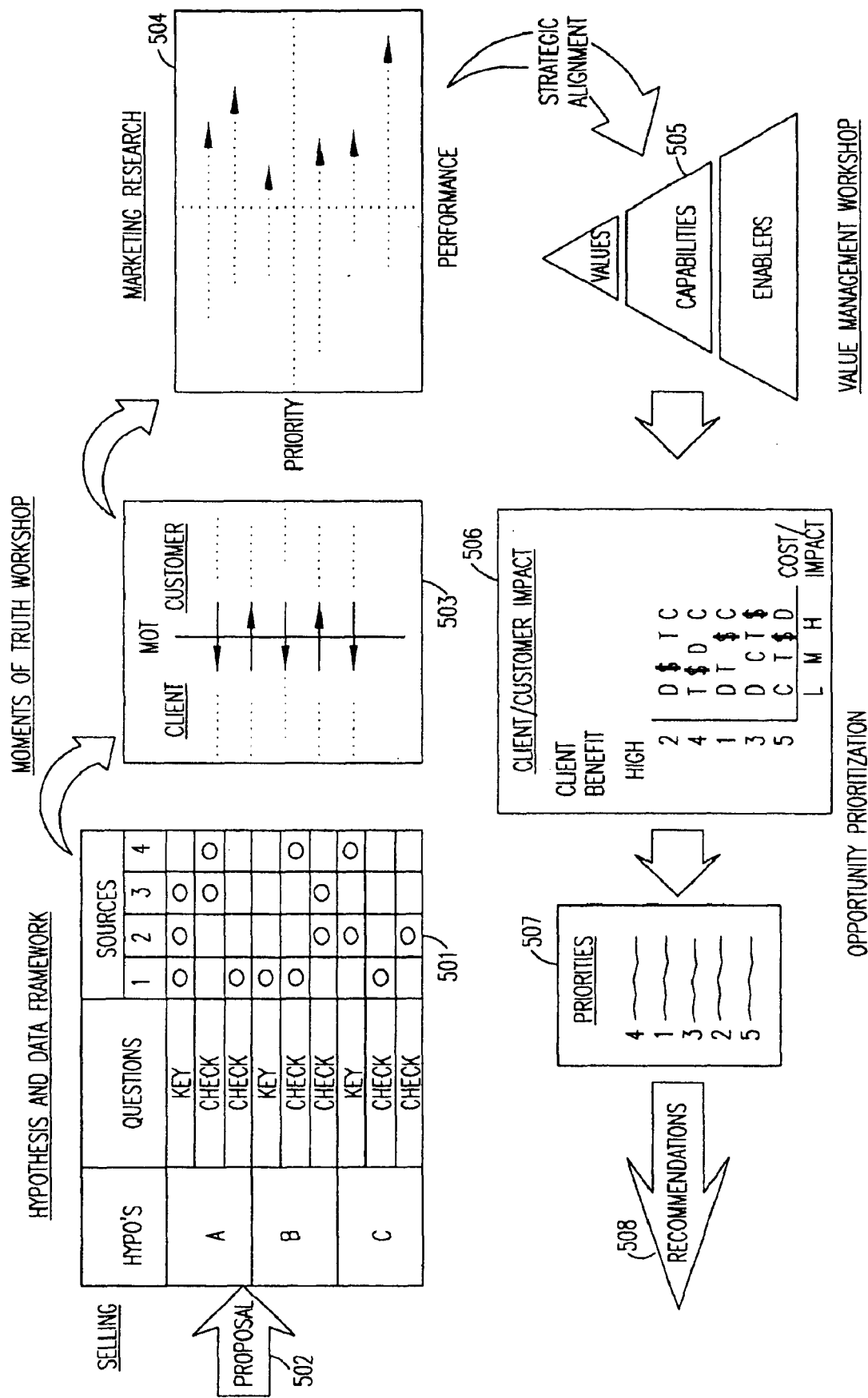
FIG. 5 is a flow chart showing the development of the hypothesis and data framework.

In FIG. 5, the hypothesis and data framework is shown as a table 501 which is populated by data from a proposal 502. The table 501 can be multiple tables which are "stacked" to create a multi-dimensional array for analyzing relationships, dependencies, etc. The data accumulated in the hypothesis and data framework is analyzed in a moments of truth (MOT) workshop 503 in which client and customer priorities are assigned. The results of this MOT workshop are used to perform market research 504, the result of which is a strategic alignment of values, capabilities and enablers that are analyzed in a value management workshop 505. The client benefit is rated against the client/customer impact 506 to develop priorities 507. This process is called opportunity prioritization; the outputs of this process are recommendations 508.

Figure 6:
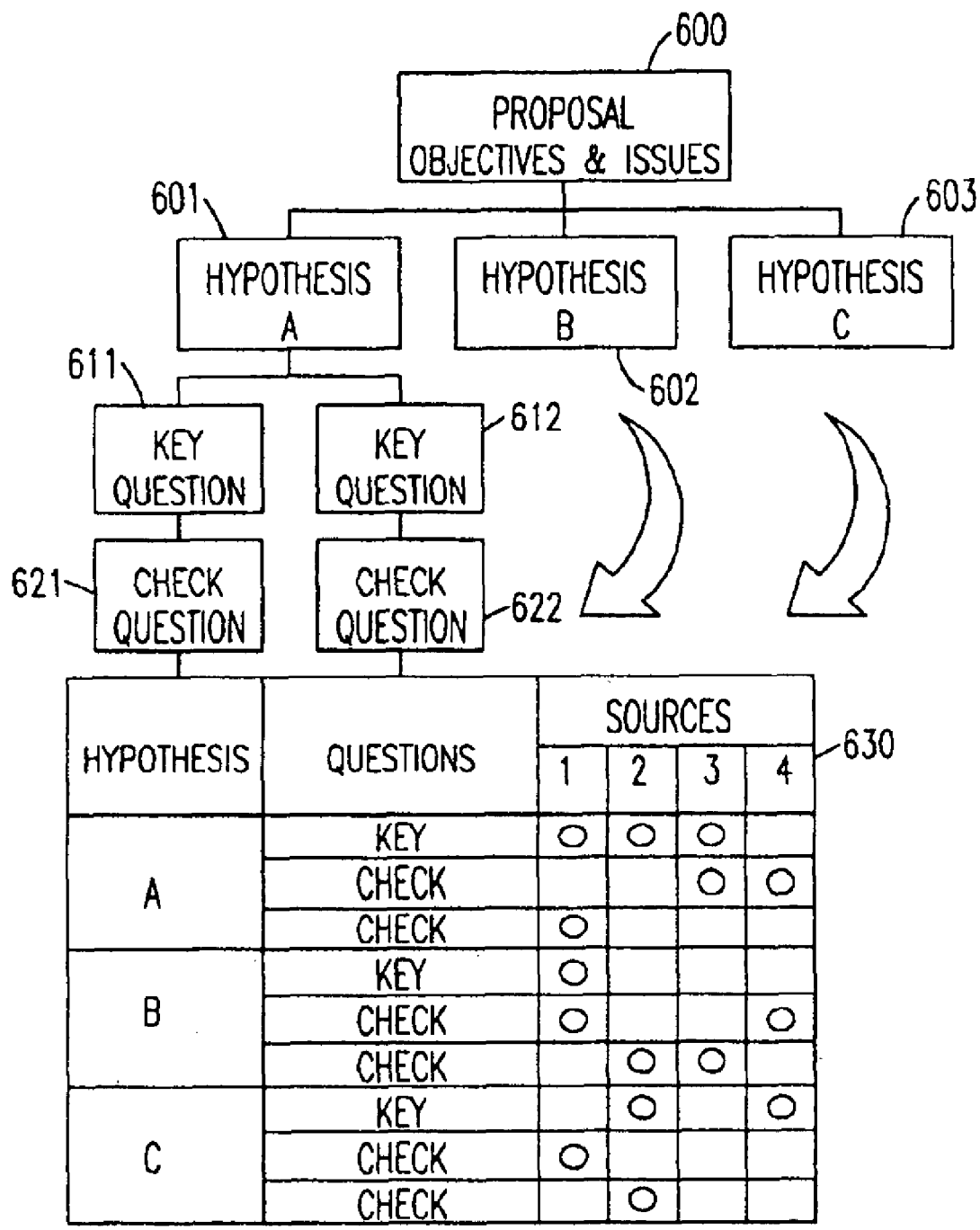
FIG. 6 is a flow chart showing in more detail the hypothesis and data framework.

FIG. 6 illustrates a hypothesis and data framework in more detail. The hypothesis and data framework is a set of tools and templates including a plurality of hypotheses 601, 602, 603 etc. and a plurality of questions 611, 612 etc. which are used to determine which facts need to be collected in response to issues and objectives 600. The questions are checked at 621, 622 to produce a matrix 630 of data sources that identifies the relevant source of information needed to respond to a question.

More particularly, the hypothesis and data framework components are as follows:

(1) Hypothesis—a potential conclusion
(2) Key Question—probes the hypothesis
(3) Check Question—tests the hypothesis
(4) Content Outline—results from testing hypothesis
(5) Layout—physical array of data, including results
(6) Sources—interviews, documents, observations
(7) Checks—validity of data gathered
(8) Staff—assigned to data gathering
(9) Time—required for data gathering Referring again to FIG. 6, a hypothesis and data framework is developed in order to provide (a) a logical approach and structure to execute the scope of work necessary to meet engagement objectives and (b) a focus on critical data to be collected and analyzed while economizing time and effort for the consulting team and participants.

Figure 7:
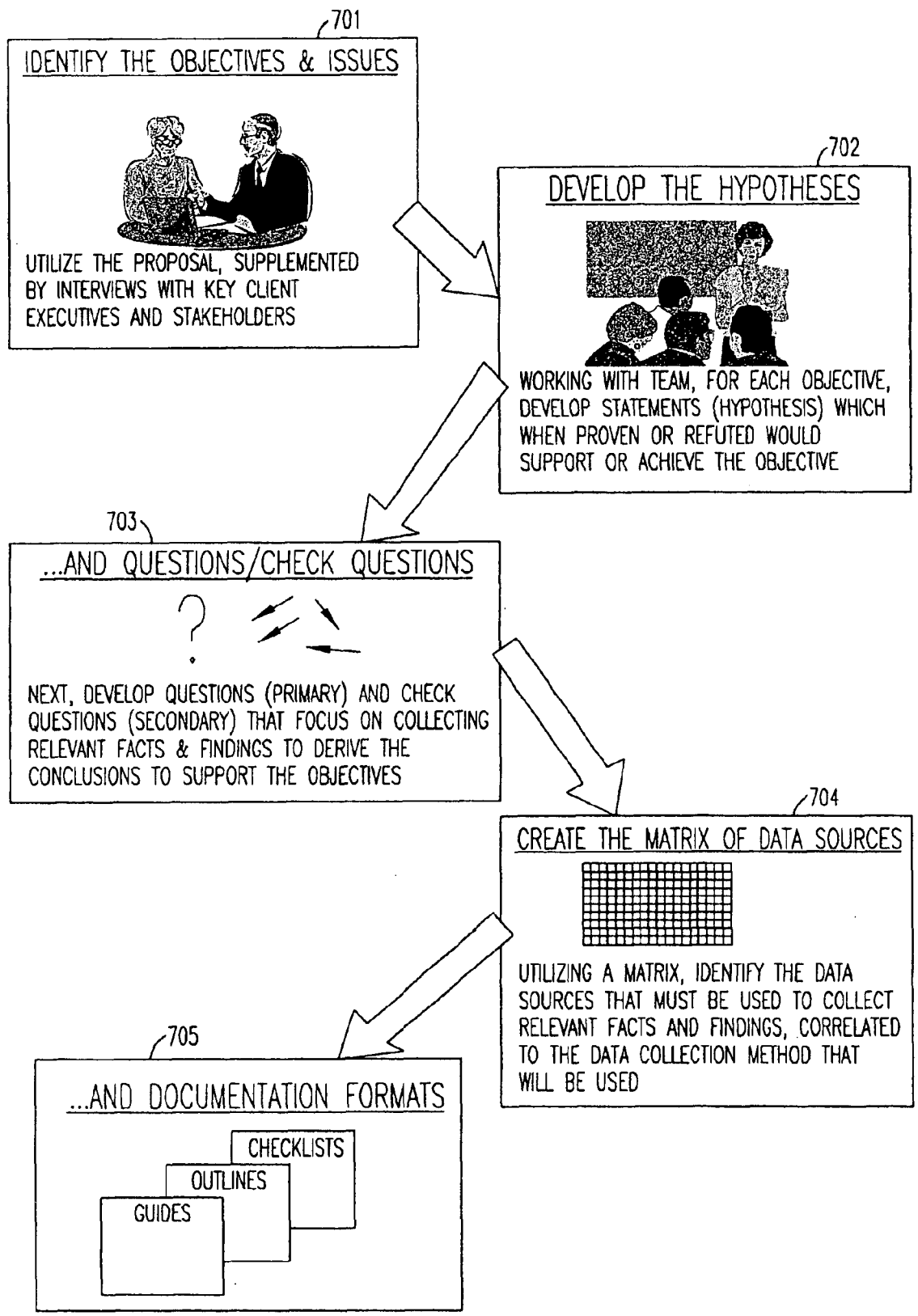
FIG. 7 is flow chart illustrating how a hypothesis and data framework are developed.

FIG. 7 illustrates the process for developing a hypothesis and data framework. The first step 701 is to identify the objectives and issues. This is done by utilizing the proposal, supplemented by interviews with key client executives and stakeholders. The second step 702 is to develop the hypotheses. Working with the team, statements (hypotheses) are developed for each objective, which when proven or refuted would support or achieve the objective. Next, in step 703, questions (primary) and check questions (secondary) are developed which focus on collecting relevant facts and findings to derive the conclusions to support the objectives. This data is then used in step 704 to create a matrix of data sources. Data sources are then identified that must be used to collect relevant facts and findings, correlated to the data collection method. Finally, in step 705, documentation formats are output. These include guides, outlines and checklists.

By way of example, assume that the client is the ABC Co. The hypotheses (to be tested) are that the ABC Co. has the characteristics required to be a world-class, customer-focused company. Specifically, the hypotheses may be listed as follows:

(1) ABC Co. has a mission, vision, and strategy which are easily understood and widely communicated.
(2) Business decisions are based upon these and are focused upon market segments.
(3) Highest value/leverage market segments are identified and targeted.
(4) Moments of Truth (Value) are identified, by segment.
(5) Needs and wants are known by MOT and by segment (customer vision), e.g. Basic/Satisfiers/Attractors.
(6) Customer needs and priorities and performance perceptions are known, by segment.
(7) ABC Co. performance improvement priorities are established (basic, satisfier, attractor "gaps").
(8) Necessary ABC Co. process capabilities are present and working.
(9) Required ABC Co. infrastructure enablers are present and functioning.
(10) Customer-defined infrastructure improvements/investments are identified and prioritized.
(11) An ongoing process is in place to monitor customer value, and to use customer value to arrive at business decisions.

By discussing the extent to which each of these hypotheses is true, "gaps" may be identified and appropriate corrective action may be taken.

Figure 10:
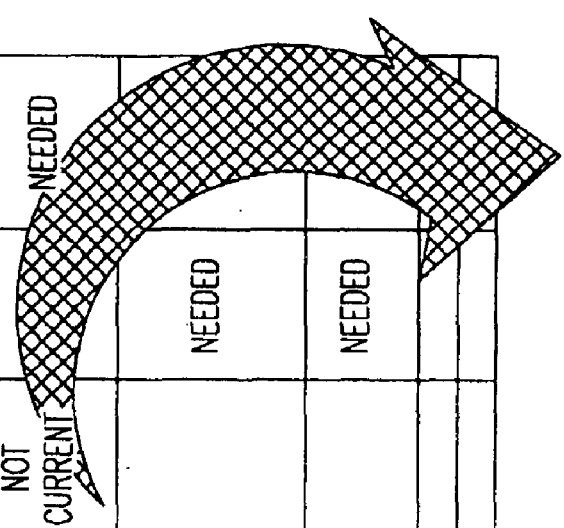
FIG. 10 is a matrix of data sources revealing the need for external marketing research.

FIGS. 8A to 8F show the hypothesis and data structure for the example of the ABC Co. Several additional hypotheses could be developed relating to the ABC Co. of this example. These might include statements about ABC Co. beliefs regarding customers' needs/wants/perceptions and "customer satisfaction," or other hypotheses relating directly to business issues, such as the statement "Improving customer call center service will result in reduced customer attrition and increased profitability." All this data is integrated into a matrix of data sources to collect the essential facts and findings, as shown in FIG. 9. In this example, the lack of data regarding customer needs reveals that external marketing research is required, as shown in FIG. 10.

The Loyalty Suite of the present invention is a set of pre-defined activities and tasks that are structured for repeatability. It therefore permits delivery, in a consistent manner and with predictable results, of recommendations to a client for planning, targeting and managing profitable customer relationships that take into account all of the processes necessary to achieve customer loyalty. The Loyalty Suite business method uses benchmarking data and industry best practices to provide industry specific criteria for measuring performance.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. An automated loyalty suite business method for managing customer relationships for a client enterprise, the method comprising the steps of:
   (a) developing a framework including hypotheses regarding the client's customer relationships and information regarding the customer relationships;
   (b) reviewing the client business strategy and the client customer relations strategy;
   (c) identifying projects to obtain data needed to develop a customer-centered strategy;
   (d) analyzing the business strategy, the customer relations strategy and the information regarding the customer relationships;
   (e) developing a customer-centered strategy;
   (f) identifying client enterprise deficiencies, including deficiencies in marketing, sales and service;
   (g) developing a customer loyalty roadmap;
   (h) using the framework, determining an inside-out view of customer expectations and determining an outside-in view of customer expectations;
   (i) validating the outside-in view of customer expectations;
   (j) prioritizing customer needs for action and/or investment;
   (k) developing a capability model and key enablers using visual tools for automating mapping of capabilities and key enablers;
   (l) recommending tasks to be performed by the client to implement the customer-centered strategy;
   (m) reviewing the client enterprise business and technology environment;
   (n) developing a customer value index and customer loyalty management approach using data mining techniques;
   (o) testing and defining the customer value index and the customer loyalty solution strategy using automated tools; and
   (p) implementing business practice changes in accordance with the capability model.

2. The loyalty suite business method of claim 1, further comprising the step of identifying factors which engender customer loyalty from a customer perspective.

3. The loyalty suite business method of claim 2, further comprising the step of determining capabilities and enablers needed for delivery of customer value by the client.

4. The loyalty suite business method of claim 1, further comprising the step of determining a value received by customers from the client enterprise.

5. The loyalty suite business method of claim 1, further comprising the step of identifying and prioritizing interactions between the client enterprise and customers, so as to define opportunities to create customer satisfaction.

6. The loyalty suite business method of claim 5, further comprising the step of identifying critical tasks to perform in order to create customer loyalty.

7. The loyalty suite business method of claim 6, wherein identification of said critical tasks leads to identification of essential client enterprise capabilities.

* * * * *